Sept. 27, 1955      M. REBUFFONI      2,719,209

ARC WELDING APPARATUS

Filed July 15, 1954

WITNESSES:
E. A. McCloskey
Leon J. Taza

INVENTOR
Martin Rebuffoni.
BY
Hymen Diamond
ATTORNEY

United States Patent Office 2,719,209
Patented Sept. 27, 1955.

2,719,209

ARC WELDING APPARATUS

Martin Rebuffoni, Williamsville, N. Y., assignor to Westinghouse Electric Corporation, East Pittsburgh, Pa., a corporation of Pennsylvania Application July 15, 1954, Serial No. 443,590

6 Claims. (Cl. 219—8)

My invention relates to arc welding apparatus and has particular relation to apparatus of the type in which the welding is produced by an arc between a so-called non-consumable electrode and the work preferably in an atmosphere of a non-reactive gas. This apparatus includes a high frequency stabilizing unit for starting and maintaining the arc. The electrode in such apparatus is usually composed of a highly refractory material, such as tungsten or molybdenum, and when I refer herein to a non-consumable electrode of the tungsten type, I mean such an electrode regardless of the material of which it may be composed. In welding with a non-consumable electrode, the joint may be made without a filler by fusing and permitting to solidify the adjacent edges of the work, or with a filler which is melted by the arc and alloys with the adjacent work. My invention is applicable to welding either with or without a filler.

In arc welding apparatus of the type just described, it is desirable that during the standby condition of the apparatus when the operator is holding the electrode and is not welding, the voltage between the electrode and the work be low to prevent injury to the operator. It is also desirable that the operator be able to start a welding operation by touching the electrode to the work without closing any switching mechanism. Arc welding apparatus having the low voltage feature and the touching feature for a consumable-electrode welding is available in accordance with the teachings of the prior art. Such apparatus usually includes a starting relay which is actuated when the electrode is touched to the work and which, when actuated, closes a contactor connecting the welding power supply to the work. When the electrode is then removed from the work, an arc is fired between the electrode and the work, and the welding may proceed. Such apparatus, while entirely suitable for welding with a consumable electrode, is unsuitable for welding with a non-consumable electrode, since the removal of the non-consumable electrode from the work while power is being applied tends to result in the burning and pitting of the non-consumable electrode tip.

In accordance with the teachings of the prior art, apparatus for welding with a non-consumable electrode has also been provided in which the power supply for welding is connected only after the electrode has been removed from the work and an arc has been fired by high frequency stabilizing supply connected between the electrode and the work. But, this apparatus is highly complex, requiring a relay which operates differentially.

It is accordingly, an object of my invention to provide arc welding apparatus for welding with a non-consumable electrode of the tungsten type, which apparatus shall be of simple and low cost structure and shall include facilities for maintaining a low voltage between the electrode and the work during standby condition and for starting the arc by touching the electrode to the work without damaging the electrode.

Another object of my invention is to provide arc welding apparatus for welding with a non-consumable electrode of low cost and simple structure having relays of the ordinary low cost type which operate reliably, which apparatus shall include facilities for maintaining a low voltage between the electrode and the work during standby and for starting the arc by merely touching the electrode to the work without damaging the electrode.

An incidental object of my invention is to provide a novel relay circuit.

In accordance with my invention, I provide arc welding apparatus of the type just described including a solenoid-actuable contactor for connecting the electrode and work to the welding power supply and a starting relay and a time delay relay for controlling the contactor. In the standby condition of the apparatus, the welding power supply is disconnected from the work and from the electrode by the contactor, and the coil of the starting relay is connected in a circuit including a low voltage supply, the electrode, and the work. Thus, a low voltage is impressed between the electrode and the work through the coil in the standby condition. When the electrode is touched to the work, the starting relay is actuated closing an energizing circuit through the coil of the time delay relay, and, at the same time, opening a contact which assures that the contactor cannot be actuated so long as the starting relay remains actuated with the circuit in its starting condition. The actuation of the time delay relay closes a contact which conditions the solenoid circuit to be closed but does not close it and another contact which closes the circuits for energizing the high frequency stabilizing unit and solenoids of the valves which control the flow of gas and cooling water to the electrode. The electrode may now be removed from the work without damaging it because the welding power supply is still disconnected from the work and when the electrode is so removed, the starting relay is deenergized, but the time delay relay remains energized for a short time interval of the order of a half second to two seconds. In addition, the high frequency stabilizing unit causes an arc to strike between the electrode and the work. Since this unit is of high impedance, the starting arc current is low and does not damage the electrode. When the starting relay reaches the unactuated condition, the energizing circuit for the solenoid being conditioned by the time delay relay is closed and the contactor is closed and power is supplied for welding. The starting relay is connected to be actuated by the potential drop produced by the resulting flow of the welding current, and it is now actuated and remains actuated so long as the welding continues. Thus, apparatus in accordance with my invention includes the low voltage standby facilities and the touch-start facilities, and these features are provided without dependence upon differential relays and without damaging the welding electrode.

The novel features that I consider characteristic of my invention are discussed generally above. The invention itself, both as to its organization and its method of operation, together with additional objects and advantages thereof, will be understood from the following description taken in connection with the accompanying drawings, in which.

Figure 1:
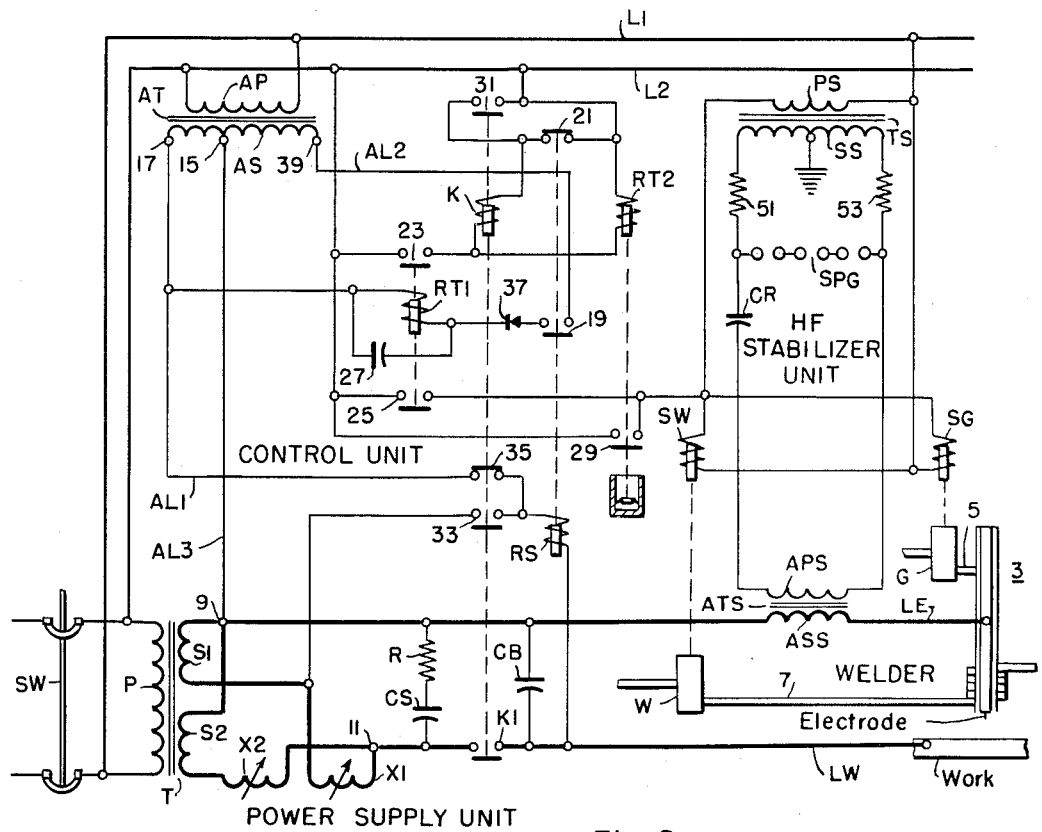
Figure 1 is a circuit diagram of a preferred embodiment of my invention.

The apparatus shown in Fig. 1 includes a welder, a power supply unit, a high frequency stabilizer unit, and a control unit. This apparatus is supplied from main conductors L1 and L2 which may be connected to the buses of a commercial supply, usually of the 220 or 440 volt type.

The welder includes an electrode holder in which is inserted a non-consumable welding electrode of the tungsten type. The holder 3 is provided with tubes 5 and 7 for supplying a shielding gas and a cooling fluid, such as water. The tubes 5 and 7 include valves G and S which are actuable by the solenoids SG and SW, respectively. The detailed structure of the electrode holder does not concern my invention and is shown only in rudimentary form. Naturally, any apparatus including the essential features of my invention falls within the scope thereof, independently of any features that the electrode holder may have.

The Power Supply Unit includes an electrode conductor LE and a work conductor LW which are connected, respectively, to the welding electrode and the work. In addition, the power supply unit includes a welding transformer T having a primary winding P and a pair of secondary windings S1 and S2 and variable impedance means in the form of coils X1 and X2. One of the terminals of one of the secondaries S1 and S2 is connected to a terminal of the other S2 at junction 9. The other terminals of the secondaries S1 and S2 are connected, respectively, each to a terminal of the impedances X1 and X2. The other terminals of impedances X1 and X2 are connected together at junction 11. The windings X1 and S1 and X2 and S2 may be combined together into a single transformer-reactor unit, as in the Westinghouse TA welder, for example.

The Power Supply Unit also includes a normally open contactor K1, which is actuable by a solenoid K. The contactor K1 is connected between the common junction 11 of the terminals of the variable impedances X1 and X2 and the work conductor LW. The common junction 9 of the secondary windings S1 and S2 is connected to the electrode conductor LE through the secondary ASS of the output transformer ATS of the High Frequency Stabilizer Unit.

The Control Unit includes a starting relay RS, time delay relays RT1, RT2 and contactor solenoid K. Power is supplied to the Control Unit from a transformer AT, having a primary AP and a secondary AS. The secondary AS has an intermediate terminal 15, the voltage between one end terminal 17 and the intermediate terminal 15 being a low voltage of the order of 30 volts.

The starting relay RS has a coil, a normally open contact 19 and a normally closed contact 21. The time delay RT1 has a coil and a pair of normally open contacts 23 and 25. The coil of the relay RT1 is shunted by a capacitor 27 having a capacity so related to the resistance of the coil that the time constant of the capacity coil network is of the order of ½ second to 2 seconds. The other time delay relay RT2 has only a normally open contact 29. Both the time delay relay RT1 and the time delay relay RT2 are of such structure that when current is supplied to their coils, they are actuated and they remain actuated when the current flow through their coils is interrupted for a predetermined time interval. This time delay in the case of relay RT1 is produced by the capacitor 27 and is of the order of ½ second to 2. For the relay RT1, the time delay is produced by an air dashpot and is of the order of 10 to 15 seconds for the relay RT2. The solenoid K, in addition to actuating the contactor K1, actuates a pair of normally open contacts 31 and 33 and a normally closed contact 35.

The coil of the starting real RS is connected in a series circuit which includes the intermediate terminal 15 of the transformer AT, the secondary ASS, the electrode conductor LE, the work conductor LW, the coil, the normally closed contact 35 actuable by the solenoid K to the terminal tap 17 of the secondary AS. When the transformer AT is energized in the usual manner, the voltage is between the electrode conductor LE and the work conductor LW and the operator is not subjected to danger of injury from high voltage. The coil of the relay RT1 is connected in a circuit extending from the terminal 17 of the secondary AS through the normally open contact 19 of the starting relay RS, a rectifier 37 preferably of the dry type, the coil, to the other terminal 39 of the secondary AS. The coil of the relay RT2 is connected in a circuit extending from conductor L1 through the coil, the normally open contact 23 of relay RT1 to the conductor L2. The solenoid K is connected in a circuit extending from conductor L1 through the normally closed contact 21 of the starting relay RS, the solenoid, the normally open contact 23 of the time delay relay RT1 to the conductor L2.

The High Frequency Stabilizer Unit is of the usual spark gap oscillator type. It includes a supply transformer TS having a secondary SS with a grounded intermediate tap. Spark gaps SPG are connected across this secondary through resistors 51 and 53. Across the spark gaps SPG a resonant network including a capacitor CR and the primary APS of the output transformer ATS are connected. The capacitor constitutes the capacity of this resonant network and the transformer ATS its inductance. The network is usually tuned to a frequency of 1.5 to 2.0 megacycles per second.

A bypass capacitor CB for bypassing the high frequency current away from the Welding Transformer is provided. This capacitor CB is connected between the work conductor LW and the electrode conductor LE through the secondary ASS. In addition, a stabilizing circuit consisting of a resistor R in series with a capacitor CS which are connected between the junctions 9 and 11 are provided. In this unit the magnitudes of resistor R and capacitor CS are such that the resistor R has sufficient damping effect to suppress oscillations by charge and discharge of the capacitor CS.

The primary PS of the supply transformer for the High Frequency Stabilizer Unit is connected between the conductors L1 and L2 through normally open contacts of time delay relays RT1 and RT2 in the Control Unit.

In the standby condition of the apparatus, the circuit breakers or switches SW for the apparatus are closed. Under such circumstances, potential is impressed across the primary P and the primary AP. Potential exists between the taps 15 and 17 of the secondary AS but since the electrode is disengaged from the work, relay RS is deenergized. At the normally open contact 19 of relay RS, delay relay RT1 is maintained deenergized. Solenoid K and relay RT2 are then maintained deenergized at one normally open contact 23 of relay RT1. Since the other contact 25 of relay RT1 and contact 29 of relay RT2 are open, the circuit through the primary PS is open so that the High Frequency Stabilizer Unit is deenergized and the energizing circuits through solenoids SW and SG are open so that the valves W and G are closed. At this time the potential between the electrode and the work is the potential between the intermediate tap and one of the terminal taps of the secondary AS, and this potential is relatively small, of the order of 30 volts.

To start a welding operation, the electrode is touched to the work. Since the potential between the electrode and the work is at this time small, and impedance of circuit large, this contact between the electrode and the work results in relatively low current and the electrode is not damaged. But the contact of the electrode and the work closes an energizing circuit for the coil of relay RS through the normally closed contact 35 actuable by the solenoid K and relay RS is actuated. At the now closed contact of relay RS, a circuit is closed through the coil of the relay RT1 across the terminals 17 and 39 of the secondary AS, and the relay RT1 is actuated. At now closed contact 25 of the relay RT1 the circuits through primary PS of the transformer TS and through solenoids SW and SG are now closed and the Stabilizer Unit is energized to supply high frequency potential through the secondary ATS between the electrode and the work, and the solenoids SW and SG are actuated to open the cooling fluid valve W and the gas valve G. The electrode is now cooled and a blanket of gas is supplied in the region between the electrode and the work. The normally open contact 23 of relay RT1 in circuit with the solenoid K is now closed, but the solenoid is not actuated because this circuit is open at now open contact 21 of relay RS. The closing of contact 21 of relay RT1 closes the circuit through the coil of relay RT2 actuating the latter. At its now closed contact 29, the relay RT2 closes a circuit through the primary PS which parallels the circuit through the now closed contact 25 of relay RT1.

There is then now a low voltage between the electrode and the work and, in addition, the high frequency voltage of the Stabilizer Unit. The Stabilizer Unit being of substantially high impedance is incapable of delivering substantial power between the electrode and the work, but is capable of firing an arc because of the ionizing effect of the high frequency.

By this time the operator has removed the electrode from the work. An arc is then produced by the high frequency which is supplied only from the high frequency generator. The current flow through this arc is relatively small and the electrode is not damaged. In addition, the removal of the electrode from the work causes relay RS to become deenergized, opening its normally open contact 19 and closing its normally closed contact 21. At the normally open contact 19 the circuit through the coil of relay RT1 is opened, but the relay remains actuated because of the time delay effect produced by the capacitor 27 in parallel with the coil. The contact 23 of relay RT1 in series with the solenoid K then remains closed, and since the normally closed contact 21 of relay RS is also closed, the solenoid K is actuated.

The contactor K1 is then closed, closing a circuit through which the transformer T supplies power for welding between the electrode and the work. In addition, the normally open contact 31 in series with the solenoid K is actuated by the solenoid K, locking in the solenoid through the contact 23 of relay RT1. Further, at a now open normally closed contact 35 actuable by the solenoid K, the circuit between the secondary AS and the coil RS is opened and the secondary AS is disconnected from the electrode and the work. But at a normally open contact 33 now closed by the solenoid K, the relay RS is supplied with current from the voltage across the reactor X1, and is actuated and maintained actuated so long as the welding current flows through the reactor X1. The normally open contact 19 of relay RS then closes the circuit through the coil of RT1, maintaining the latter actuated during the welding operation. The normally-closed now open contact 21 of relay RS does not affect the operation, since the solenoid K is locked in through its now closed contact 31. The welding may now proceed in the usual manner.

If the operator should now desire to interrupt the welding for a short time interval or if the arc should be interrupted accidentally by removal of the electrode from the work, the relay RS would become deenergized but the operation would not be affected because the relay RT1 would remain actuated for the short time interval by the delay effect produced by the capacitor in parallel with the coil. On the other hand, at the end of a welding operation the removal of the electrode from the work and the breaking of the arc would result in the interruption of a supply of current through the relay RS. Under such circumstances the circuit through the coil of the relay RT1 would be opened and after the time delay for which the relay RT1 is set, the latter would be deenergized and its normally open contacts 23 and 25 would open. Solenoid K would then be deenergized and at contactor K1 would open the supply circuit from the transformer T. But the relay RT2 would remain actuated for a time interval of the order of 15 seconds to a minute. The Stabilizer Unit would then continue to supply high frequency power to the arc and the electrode would be maintained cool and the arc blanketed in inert gas until the electrode and the work cooled sufficiently to avoid any damage to either. Eventually, relay RT2 would be deenergized, deenergizing the Stabilizer Unit and closing the valves W and G and the system would now be reverted to a standby condition.

It appears, then, that I have provided welding apparatus for welding with a non-consumable electrode in an inert gas atmosphere which may be started by touching the electrode to the work without damaging the electrode. The apparatus includes a number of relays but these relays are of low cost standard type and not of the differential type.

Specifically, I have constructed and found to operate satisfactorily apparatus having the following components: The welding transformer T, the Stabilizer Unit and the other circuit components including the bypass capacitor and the Stabilizing capacitor and resistor are preferably the usual components of the Westinghouse TA welder. The electrode holder may be of the usual type available in the trade. Such an electrode holder is sold with the necessary valves such as G and W and the associated solenoids. The starting relay RS is a Potter-Brumfield relay PR–11A having a 24-volt alternating current coil. The time delay relay RT1 is a Potter-Brumfield relay type PR–1528 having a coil designed for 115 volts half-wave direct current. The contactor K1, its solenoid K and the associated contacts is a Westinghouse 3-pole size 2 type N contactor having a 230 volt coil. The time delay relay RT2 is a Westinghouse type AM air-pot time delay relay. The reactor X1 has a voltage of the order of 24 volts across it during operation for all load conditions in the welding range. The impedance of this reactor, of course, varies depending on its setting, the range of impedances being between .12 ohm for the highest setting and 2.4 ohms for the lowest setting in the case of a 200 ampere TA welder.

Figure 2:
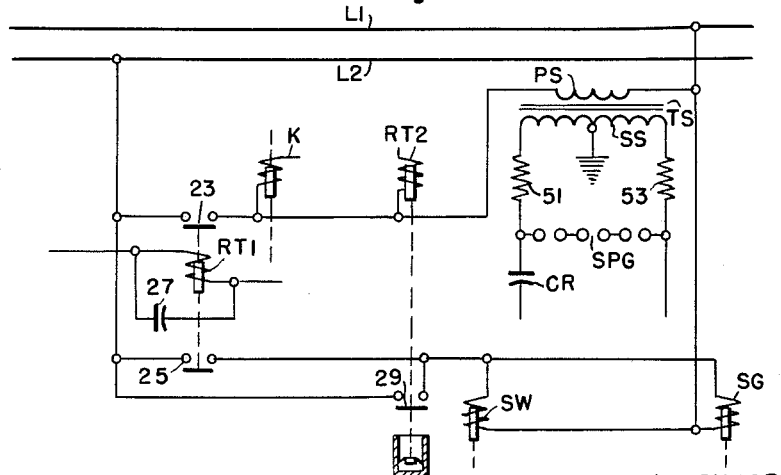
Fig. 2 is a diagram showing a modification of my invention.

The Fig. 2 modification differs from the Fig. 1 modification only in the fact that the primary PS of the Stabilizer transformer TS is so connected that on the opening of the contact of relay RT1 the primary circuit is opened and the supply of potential from the Stabilizer Unit is interrupted. The circuit through the primary PS is closed then and is opened by the opening of the normally open contact 23 of relay RT1 when the latter is deenergized. Since this contact 23 is not shunted by contact 29 as is the contact 21 which closes the Stabilizer circuit in the Fig. 1 modification, the supply of stabilizer power is interrupted immediately on deenergization of relay RT1.

While I have shown and described certain specific embodiments of my invention, many modifications thereof are possible. My invention, therefore, is not to be restricted except insofar as is necessitated by the spirit of the prior art.

I claim as my invention:

1. Arc welding apparatus for welding with a non-consumable electrode of the tungsten type, including a welding transformer having a primary and a secondary, conductor means to be connected to said welding electrode and work to be welded for conducting welding current, contactor means, a solenoid for actuating said contactor means, a low voltage power supply, a starting relay having a coil and at least a normally closed contact, a first time delay relay having a coil, said last-named relay being actuable on the supply of current to said coil and remaining actuated during a first predetermined time interval after said supply of current is interrupted, a second time delay relay having a coil, said last-named relay being actuable on the supply of current to said last-named coil and remaining actuated a second predetermined time interval after said last-named supply of current is interrupted, said second time interval being substantially longer than said first time interval, high frequency stabilizing means coupled to said conductor means, valve means for controlling the supply of fluid to said electrode, a normally open energizing circuit for said valve means, a normally open energizing circuit for stabilizing means, a normally open energizing circuit for said solenoid, including said normally closed contact, a normally open energizing circuit for said first time delay relay, a normally open energizing circuit for said second time delay relay, means connecting in series said low voltage supply, said coil of said starting relay and said conductor means, means responsive to actuation of said starting relay for closing said energizing circuit for said first delay relay, means responsive to actuation of said first delay relay for closing said energizing circuits for said stabilizing means, said second delay relay and said valve means and for conditioning said energizing circuit for said solenoid to be closed when actuation of said starting relay is interrupted, means responsive to actuation of said second delay relay for closing said energizing circuits for said stabilizing means and said valve means independently of said first delay relay, and means connecting said contactor in circuit between said transformer and said conductor means.

2. Arc welding apparatus for welding with a non-consumable electrode of the tungsten type, including a welding transformer having a primary and a secondary, conductor means to be connected to said welding electrode and parts to be welded for conducting welding current, contactor means, a solenoid for actuating said contactor means, a low voltage power supply, a starting relay having a coil, a first time delay relay having a coil, said last-named relay being actuated on the supply of current to said coil and remaining actuated during a first predetermined time interval after said supply of current is interrupted, valve means for controlling the supply of fluid to said electrode, a normally open energizing circuit for said valve means, a normally open energizing circuit for said solenoid, said energizing circuit for said solenoid including means responsive to initial actuation of said starting relay for maintaining it open so long as said starting relay remains actuated after initial actuation, a normally open energizing circuit for said first time delay relay, means connecting in series said low voltage supply, said coil of said starting relay and said conductor means, means responsive to actuation of said starting relay for closing said energizing circuit for said first delay relay, means responsive to actuation of said first delay relay for closing said energizing circuits for said valve means and for conditioning said energizing circuit for said solenoid to be closed when actuation of said starting relay is interrupted, and means connecting said contactor in circuit between said transformer and said conductor means.

3. Arc welding apparatus for welding with a non-consumable electrode of the tungsten type, including a welding transformer having a primary and a secondary, impedance means, conductor means to be connected to said electrode and parts for conducting welding current, high frequency stabilizing means, a normally open energizing circuit for said stabilizing means, fluid supply valve means, a normally open energizing circuit for said valve means, a starting relay having a coil, a low voltage power supply, means connecting in series said low voltage supply, said coil and said conductor means, normally open contactor means, means connecting in series said secondary, said impedance, said contactor means and said conductor means, solenoid means for actuating said contactor means, a normally open energizing circuit for said solenoid means, a time delay relay having a coil, a normally open energizing circuit for said last-named coil, said delay relay being actuable on the supply of current to said coil and remained actuated a predetermined time interval after said current is interrupted, means responsive to actuation of said starting relay for closing said energizing circuit for said delay relay, means responsive to actuation of said starting relay for preventing said energizing circuit for said solenoid means from being closed so long as said starting relay remains actuated, means responsive to actuation of said delay relay for conditioning said energizing circuit for said solenoid means to be closed on interruption of the actuation of said starting relay, means responsive to actuation of said delay relay for closing said energizing circuit for said stabilizing means, means responsive to actuation of said delay relay for closing said energizing circuit for said valve means, means responsive to actuation of said solenoid means for maintaining said energizing circuit for said solenoid means closed independently of said preventing means, means responsive to actuation of said solenoid means for opening said connection including said low voltage supply and said coil of said starting relay, and means responsive to actuation of said solenoid means for connecting said coil of said starting relay in parallel with said impedance means and said contactor.

4. Arc welding apparatus for welding with a non-consumable electrode of the tungsten type, including a welding transformer having a primary and a secondary, impedance means, conductor means to be connected to said electrode and parts for conducting welding current, fluid supply valve means, a normally open energizing circuit for said valve means, a starting relay having a coil, a low voltage power supply, means connecting in series said low voltage supply, said coil and said conductor means, normally open contactor means, means connecting in series said secondary, said impedance means, said contactor means and said conductor means, solenoid means for actuating said contactor means, a normally open energizing circuit for said solenoid means, a time delay relay having a coil, a normally open energizing circuit for said last-named coil, said delay relay being actuable on the supply of current to said coil and remained actuated a predetermined time interval after said current is interrupted, means responsive to actuation of said starting relay for closing said energizing circuit for said delay relay, means responsive to actuation of said starting relay for preventing said energizing circuit for said solenoid means from being closed so long as said starting relay remains actuated, means responsive to actuation of said delay relay for conditioning said energizing circuit for said solenoid means to be closed on interruption of the actuation of said starting relay, means responsive to actuation of said delay relay for closing said energizing circuit for said valve means, means responsive to actuation of said solenoid means for maintaining said energizing circuit for said solenoid means closed independently of said preventing means, means responsive to actuation of said solenoid means for opening said connection including said low voltage supply and said coil of said starting relay, and means responsive to actuation of said solenoid means for connecting said coil of said starting relay in parallel with said impedance means and said contactor.

5. Arc welding apparatus for welding with a non-consumable electrode of the tungsten type, including a welding transformer having a primary and a secondary, impedance means, conductor means to be connected to said electrode and parts for conducting welding current, high frequency stabilizing means, a normally open energizing circuit for said stabilizing means, a starting relay having a coil, a low voltage power supply, means connecting in series said low voltage supply, said coil and said conductor means, normally open contactor means, means connecting in series said secondary, said impedance, said contactor means and said conductor means, solenoid means for actuating said contactor means, a normally open energizing circuit for said solenoid means, a time delay relay having a coil, a normally open energizing circuit for said last-named coil, said delay relay being actuable on the supply of current to said coil and remaining actuated a predetermined time interval after said current is interrupted, means responsive to actuation of said starting relay for closing said energizing circuit for said delay relay, means responsive to actuation of said starting relay for preventing said energizing circuit for said solenoid means from being closed so long as said starting relay remains actuated, means responsive to actuation of said delay relay for conditioning said energizing circuit for said solenoid means to be closed on interruption of the actuation of said starting relay, means responsive to actuation of said delay relay for closing said energizing circuit for said stabilizing means, means responsive to actuation of said solenoid means for maintaining said energizing circuit for said solenoid means closed independently of said preventing means, means responsive to actuation of said solenoid means for opening said connection including said low voltage supply and said coil of said starting relay, and means responsive to actuation of said solenoid means for connecting said coil of said starting relay in parallel with said impedance means and said contactor.

6. Apparatus according to claim 3 characterized by means actuable by the actuation of the delay relay for maintaining the energizing circuits for the stabilizing means and the valve means closed at least a predetermined time interval after the actuation of said delay relay is interrupted.

References Cited in the file of this patent
UNITED STATES PATENTS

| | | |
|---|---|---|
| 2,573,901 | Girard | Nov. 6, 1951 |
| 2,634,355 | Girard | Apr. 7, 1953 |